United States Patent
Kim et al.

(10) Patent No.: US 7,868,583 B2
(45) Date of Patent: Jan. 11, 2011

(54) APPARATUS AND METHOD FOR CONTROLLING BATTERY RECHARGING AND DISCHARGING IN A PORTABLE TERMINAL

(75) Inventors: Ji-Hwa Kim, Daegu (KR); Jae-Hyoung Jeon, Gumi-si (KR); Byung-Kwan Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

(21) Appl. No.: 11/864,299

(22) Filed: Sep. 28, 2007

(65) Prior Publication Data

US 2008/0224654 A1 Sep. 18, 2008

(30) Foreign Application Priority Data

Mar. 13, 2007 (KR) ................. 10-2007-0024567

(51) Int. Cl.
 *H02J 7/00* (2006.01)
(52) U.S. Cl. ..................... 320/103; 307/66
(58) Field of Classification Search ............ 320/103
 See application file for complete search history.

(56) References Cited

U.S. PATENT DOCUMENTS

| 5,504,413 | A | * | 4/1996 | Fernandez et al. | ......... 320/163 |
| 5,963,015 | A | * | 10/1999 | Lee | ............ 320/128 |
| 2006/0103242 | A1 | * | 5/2006 | Lin | ............ 307/66 |

FOREIGN PATENT DOCUMENTS

KR 10-2003-0065066 A 8/2003
KR 10-2006-0129631 A 12/2006

* cited by examiner

*Primary Examiner*—Edward Tso
*Assistant Examiner*—M'Baye Diao
(74) *Attorney, Agent, or Firm*—Jefferson IP Law, LLP

(57) ABSTRACT

An apparatus and method for controlling battery discharging in a portable terminal having a detachable external battery are provided. The method includes determining if the external battery has been connected with the portable terminal when the portable terminal is booted, receiving power from the external battery when the external battery is connected with the portable terminal and receiving power from an embedded battery of the portable terminal when the external battery has been completely discharged. Furthermore, in charging the batteries, the embedded battery of the portable terminal is first charged when battery charging current is input in a state that the external battery has been connected with the portable terminal, and the external battery is charged when the embedded battery has been completely charged. Power from the external battery is first used when a portable terminal assembled with the external battery is used, and an embedded battery is first charged in charging batteries. Therefore, the embedded battery capacity of the portable terminal can be maintained as much as possible. Furthermore, although the external battery is separated from the portable terminal during battery charging/discharging, the embedded battery capacity can be maintained as much as possible. As a result, even if only the embedded battery is used, a using time of the embedded battery can be increased. Therefore, it is possible to improve the user's convenience.

22 Claims, 5 Drawing Sheets

APPARATUS AND METHOD FOR CONTROLLING BATTERY RECHARGING AND DISCHARGING IN A PORTABLE TERMINAL

PRIORITY

This application claims the benefit under 35 U.S.C. §119(a) of a Korean patent application filed in the Korean Industrial Property Office on Mar. 13, 2007 and assigned Serial No. 2007-24567, the entire disclosure of which is hereby incorporated by reference.

BACKGROUND OF THE INVENTION

1. Field of the Invention

The present invention relates to a portable terminal. More particularly, the present invention relates to an apparatus and method for controlling battery recharging and discharging in a portable terminal.

2. Description of the Related Art

Various functions have been recently added to a portable terminal so as to satisfy various user demands. Particularly, as well as typical functions such as sending mail, accessing the Internet, playing games, etc., a multimedia function for transmitting data and video, which is widely used, has been added to the portable terminal.

There is an advantage when such various functions are added to the portable terminal in that a user can be provided with various kinds of conveniences via the portable terminal. However, there is also a disadvantage in that such additions cause the amount of power in the portable terminal, i.e. the amount of battery consumption, to continuously increase. Therefore, due to the increased amount of battery consumption, the user has to charge the battery of the portable terminal more often than in the past.

In this case, a detachable external battery, which can be attached to and detached from the portable terminal depending on the user's need, may be used for addressing the inconvenience that the user has to frequently charge a battery of the terminal.

Meanwhile, a portable terminal having a detachable external battery first uses power of the embedded battery and then uses power of the external battery in a state that the external battery has been connected therewith. As a result, when the user detaches the external battery from the portable terminal in a state that the user uses almost all the amount of power of the embedded battery, i.e. in a state that the embedded battery is nearly discharged, it is often caused that the user can not use the portable terminal due to shortage of the embedded battery capacity.

Furthermore, in charging batteries, a portable terminal having a detachable external battery simultaneously charges both an embedded battery and an external battery. Therefore, when the user uses the portable terminal after detaching the external battery from the portable terminal while charging the batteries, the charge capacity of the embedded battery may be insufficient.

SUMMARY OF THE INVENTION

An aspect of the present invention is to address the above-mentioned problems and/or disadvantages and to provide at least the advantages described below. Accordingly, an aspect of the present invention is to provide an apparatus and a method for controlling efficient battery recharging/discharging in a portable terminal having a detachable external battery.

In accordance with an aspect of the present invention, a method for controlling battery discharging in a portable terminal having a detachable external battery is provided. The method includes determining if the external battery has been connected with the portable terminal when the portable terminal is booted, receiving power from the external battery when the external battery is connected with the portable terminal and receiving power from an embedded battery of the portable terminal when the external battery has been completely discharged.

In accordance with another aspect of the present invention, a method is provided for receiving power from an embedded battery when an external battery is separated from a portable terminal during discharging.

In accordance with yet another aspect of the present invention, a method for controlling battery discharging in a portable terminal having a detachable external battery is provided. The method includes determining if the external battery has been connected with the portable terminal when the portable terminal is booted, outputting a message for selection of the priority in discharging the batteries by the user when the external battery has been connected with the portable terminal and, when one of the external battery and an embedded battery of the portable terminal is selected by the user who has confirmed the message, receiving power from the selected battery.

In accordance with another aspect of the present invention, a method is provided for receiving power from an embedded battery if an external battery is separated from a portable terminal during discharging in a case that a selected battery is the external battery.

In accordance with another aspect of the present invention, an apparatus for controlling battery discharging in a portable terminal having a detachable external battery is provided. The apparatus includes a power supply unit for applying power supplied from the external battery or an embedded battery of the portable terminal to the portable terminal, a switching unit for switching power of the embedded battery or the external battery so as to transfer the switched power to the power supply unit and a controller for determining if the external battery has been connected with the portable terminal when the potable terminal is booted, applying power of the external battery to the power supply unit through the switching unit when the external battery has been connected with the portable terminal, and applying power of the embedded battery to the power supply unit when the external battery is completely discharged.

In accordance with another aspect of the present invention, a method for controlling battery charging in a portable terminal having a detachable external battery is provided. The method includes charging an embedded battery of the portable terminal when battery charging current is input in a state that the external battery has been connected with the portable terminal and charging the external battery when the embedded battery has been completely charged.

In accordance with another aspect of the present invention, a method is provided for outputting a message for notifying that a corresponding battery is being charged while an embedded battery or an external battery is charged.

In accordance with another aspect of the present invention, a method for controlling battery charging in a portable terminal having a detachable external battery is provided. The method includes determining if the external battery has been connected with the portable terminal when battery charging current is input, outputting a message for selection of the priority in charging the batteries by the user when the external battery has been connected with the portable terminal and, when one of the external battery and an embedded battery of the portable terminal is selected by a user who has confirmed the message, firstly charging the selected battery.

In accordance with another aspect of the present invention, an apparatus for controlling battery charging in a portable terminal having a detachable external battery is provided. The apparatus includes a charging unit for charging an embedded battery or the external battery with current input from an external charger, a controller for charging the embedded battery when battery charging current is input from the charger in a state that the external battery has been connected with the portable terminal, and charging the external battery when the embedded battery has been completely charged.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also descriptions of well-known functions and constructions are omitted for clarity and conciseness.

Figure 1:
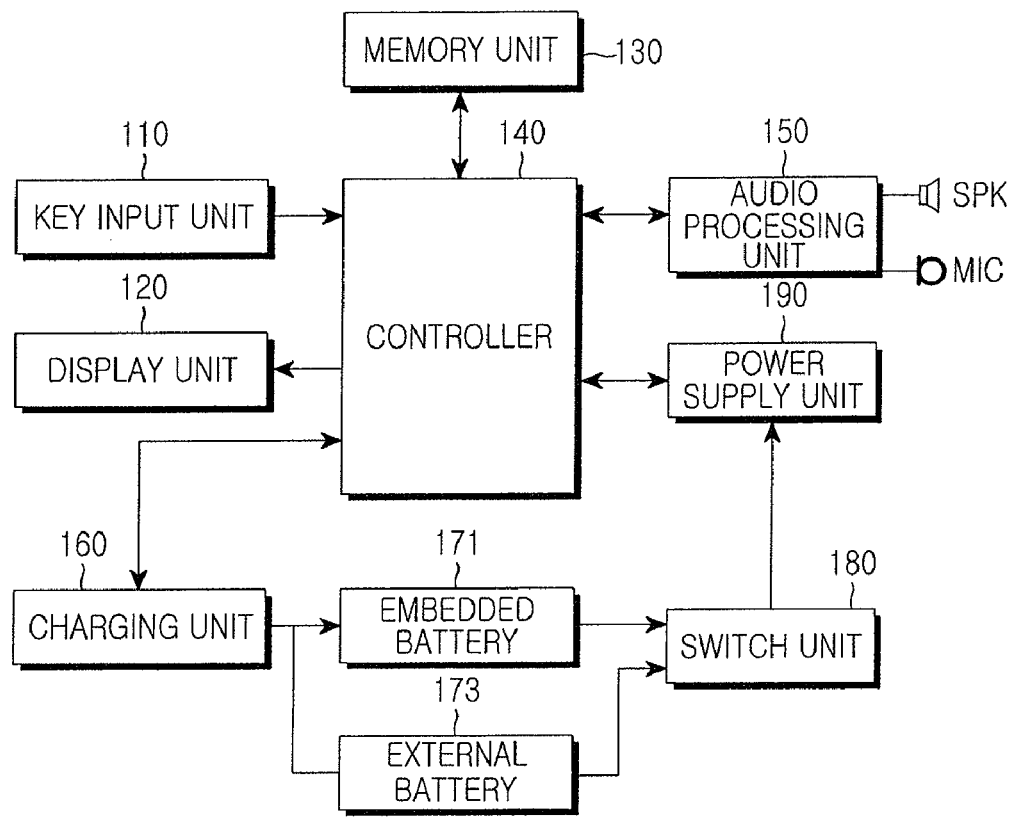
FIG. 1 is a block diagram illustrating a portable terminal according to an exemplary embodiment of the present invention.

FIG. 1 is a block diagram illustrating a portable terminal according to an exemplary embodiment of the present invention.

The illustrated portable terminal includes a key input unit 110, a display unit 120, a memory unit 130, a controller 140, an audio processing unit 150, a charging unit 160, an embedded battery 171, an external battery 173, a switch unit 180, and a power supply unit 190.

The key input 110 may include character keys, numeric keys, various function keys, an external volume key, etc. and outputs a key input signal corresponding to a key input from a user to the controller 140.

The display unit 120 may include a Liquid Crystal Display (LCD), etc. and outputs a wide variety of display data generated in the portable terminal. In a case that the LCD is implemented with a touch screen, the display unit 120 may also operate as an input unit.

The memory unit 130 may include program memories and data memories, and stores a wide variety of information required for controlling operation of the portable terminal according to an exemplary embodiment of the present invention and a wide variety of information selected by the user. In an exemplary embodiment, the memory unit 130 includes a flash memory.

The controller 140 performs a control operation such that overall operation of the portable terminal according to an exemplary embodiment of the present invention is controlled.

In battery discharging of the portable terminal, the controller 140 determines if the external battery 173 has been connected with the portable terminal. In an exemplary implementation, the controller may determine if the external battery 173 has been connected after the portable terminal is booted. The controller 140 applies power of the external battery 173 to the power supply unit 190 through the switch unit 180 when the external battery 173 is connected with the portable terminal. In an exemplary embodiment, the controller 140 applies power from the embedded battery 171 to the power supply unit 190 if the external battery 173 is separated from the portable terminal while power from the external battery 173 is applied to the power supply unit 190.

Furthermore, when the external battery 173, of which power is applied to the power supply unit 190, is completely discharged, the controller 140 applies power from the embedded battery 171, which is embedded in the portable terminal, to the power supply unit 190.

After the portable terminal is booted, the controller 140 may output a text or voice containing a message which prompts the user to select a priority in discharging the batteries, when the external battery 173 has been connected with the portable terminal. At this time, when one of the embedded battery 171 and the external battery 173 is selected by the user who has responded to the message, the controller 140 applies power from the selected battery to the power supply unit 190. Furthermore, in an exemplary embodiment the controller 140 first applies power from the external battery 173 to the power supply unit 190 if no selection is made before expiration of a time interval.

In a case that the selected battery is the external battery 173, if the external battery 173 is detached from the portable terminal during discharging, the controller 140 applies power of the embedded battery 171 to the power supply unit 190.

In charging a battery of the portable terminal, the controller 140 first charges the embedded battery 171 when battery charging current is input from a charger (not shown) in a state that the external battery 173 has been connected with the portable terminal. The controller 140 charges the external battery 173 when the embedded battery 171 is completely charged. At this time, the controller 140 may output a message for notifying that the corresponding battery is being charged.

Furthermore, the controller 140 may output a message prompting the user to select a priority in charging of the batteries when the battery charging current is input in a state that the external battery 173 is connected with the portable terminal. At this time, when one of the embedded battery 171 and the external battery 173 is selected by the user, the controller 140 first charges the selected battery. Meanwhile, if one of the embedded battery 171 and the external battery 173 is not selected before expiration of a time interval after the message is output, the controller 140 may first charge the embedded battery 171. Meanwhile, when the selected battery is the external battery 173, the controller 140 charges the embedded battery 171 if the external battery 173 is detached from the portable terminal during charging.

The audio processing unit 150 modulates electronic signals input by a microphone and converts them to voice data. The audio processing unit 150 demodulates encoded voice data input from a wireless transceiver (not shown) to electronic signals and outputs them via a speaker.

Furthermore, the audio processing unit 150 desirably includes a codec so as to convert digital audio signals, which are received from the wireless transceiver, to analog signals for regeneration, and so as to convert analog audio signals, which are generated by a microphone, to digital audio signals. The codec includes a data codec for processing packet data, etc. and an audio codec for processing audio signals such as voice. The codecs may be separated from or included in the controller 140.

The portable terminal may be connected with an external charger (e.g. a charging adapter). Therefore, the charging unit 160 charges the embedded battery 171 or the external battery 173 with a battery charging current (or voltage) input from the external charger (not shown).

Under the control of the controller 140, the embedded battery 171 or the external battery 173 applies charging power with which the charging unit 160 has charged the corresponding battery to the power supply unit 190. Meanwhile, the external battery 173 is detachably assembled with the portable terminal.

Under the control of the controller 140, the switch unit 180 switches one of power from the embedded battery 171 and power from the external battery 173 and transfers the switched power to the power supply unit 190.

The power supply unit 190 controls a voltage applied from the embedded battery 171 or the external battery 173 to have a proper lever, and then supplies the voltage with a direct voltage to each unit constituted in the portable terminal.

Figure 2:
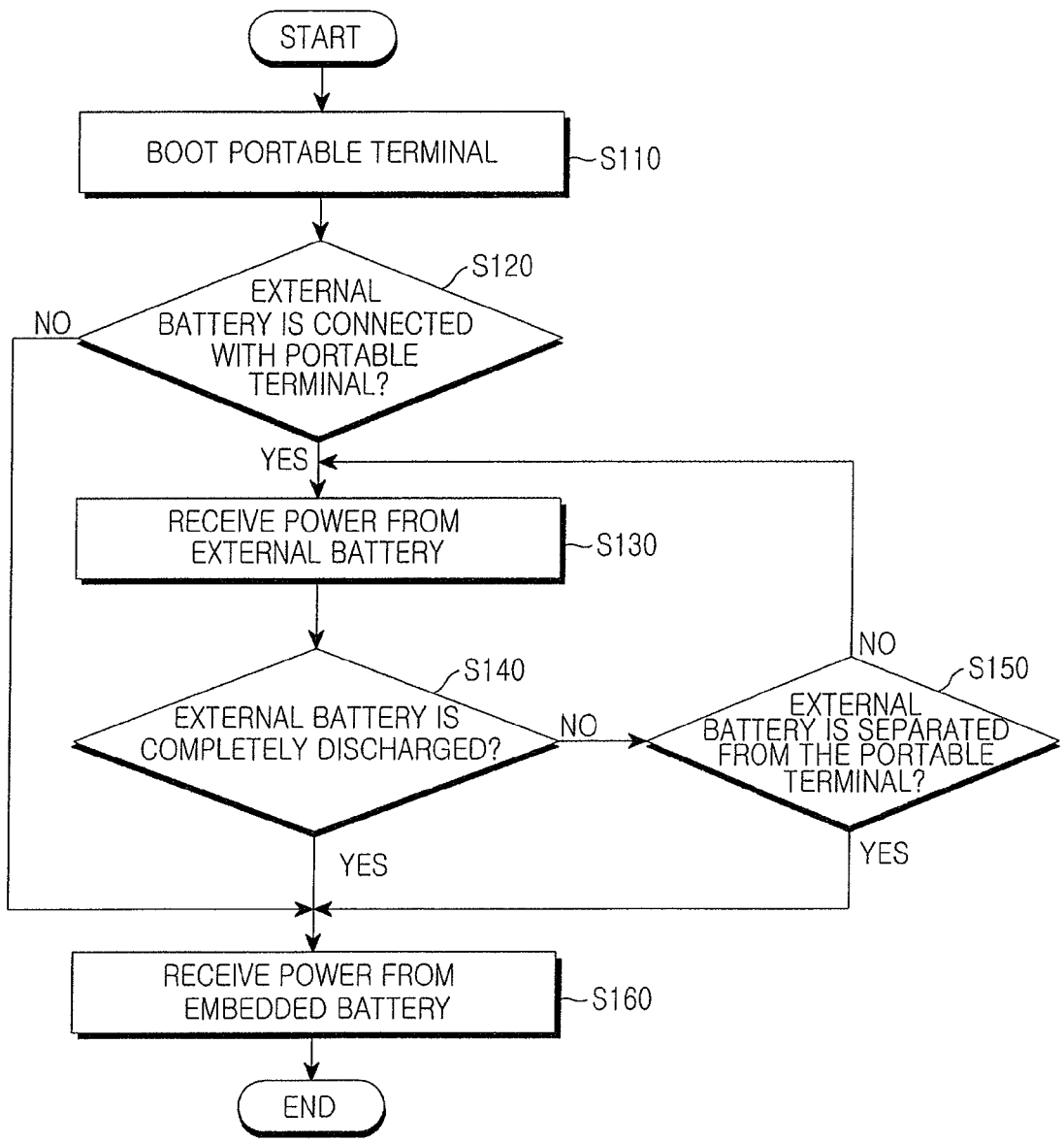
FIG. 2 is a flow chart illustrating a process for controlling battery discharging of the portable terminal according to an exemplary embodiment of the present invention.

FIG. 2 is a flow chart illustrating a process for controlling battery discharging of the portable terminal according to an exemplary embodiment of the present invention.

Referring to FIGS. 1 and 2, the controller 140 boots the portable terminal in step S110. In an exemplary embodiment, the controller 140 may boot the portable terminal when a power key of the key input unit 110 is input.

When the portable terminal is booted, the controller 140 determines if the external battery 173 has been connected with the portable terminal in step S120.

When the external battery 173 has been connected with the portable terminal, the controller 140 causes the switch unit 180 to be controlled such that the external battery 173 and the power supply unit 190 are connected with each other. The controller 140 receives power from the external battery 173 so as to apply the power to the power supply unit 190 in step S130.

The controller 140 determines if the external battery 173, which supplies power to the power supply unit 190, is completely discharged in step S140.

When the external battery 173 is not completely discharged, the controller 140 determines if the external battery 173 is separated from the portable terminal during the discharging of the external battery 173 in step S150.

The controller 140 receives power from the embedded battery 171 and applies the power to the power supply unit 190 when the external battery 173 is detached from the portable terminal during discharging in step S160.

Meanwhile, when it has been determined in step S140 that the external battery 173 is completely discharged, the controller 140 causes the switch unit 180 to be controlled such that the embedded battery 171 and the power supply unit 190 are connected with each other. Then, the controller 140 receives power from the embedded battery 171 and supplies the power to the power supply unit 190 in step S160.

Figure 3:
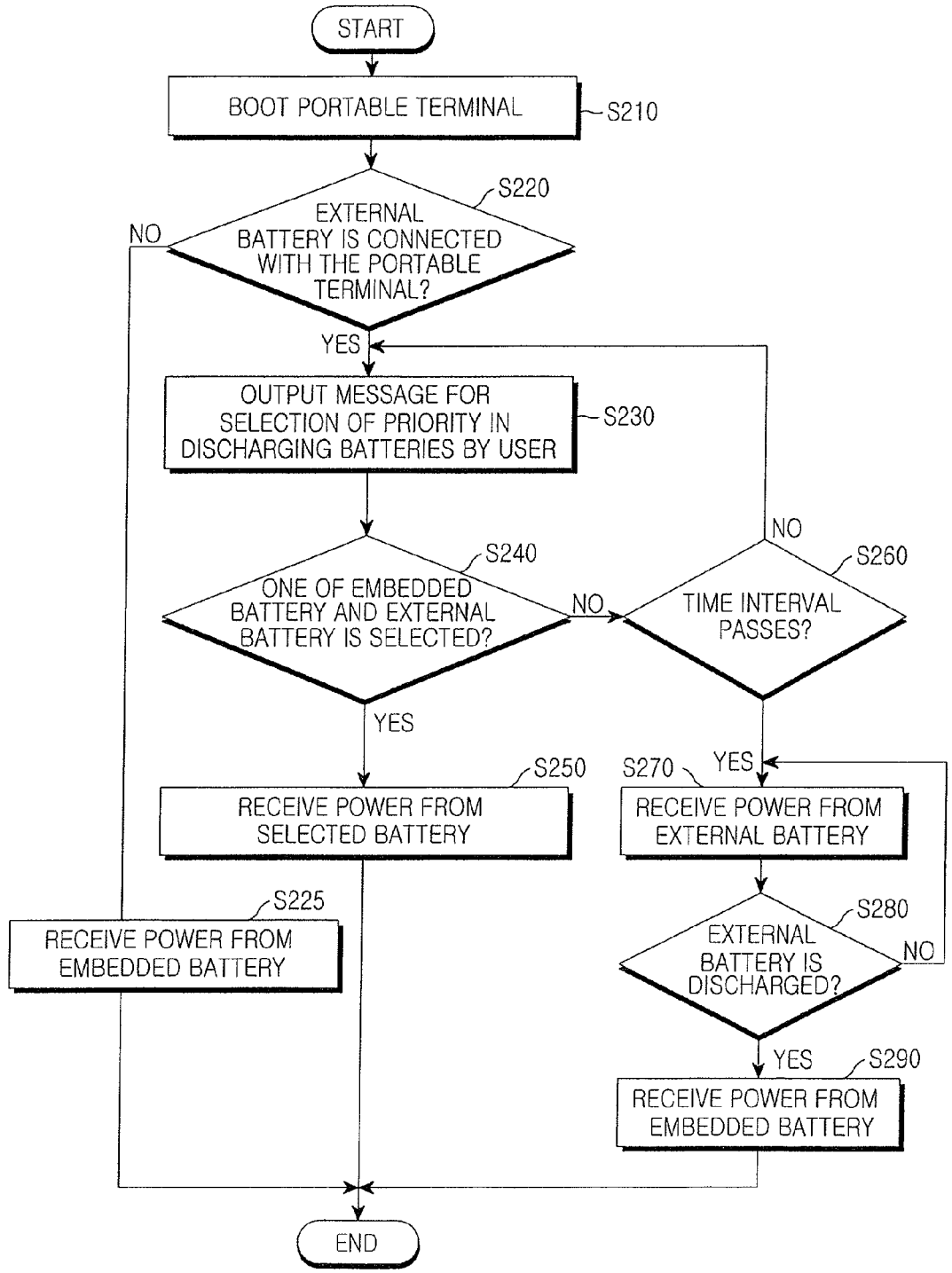
FIG. 3 is a flow chart illustrating a process for controlling battery discharging of the portable terminal according to an exemplary embodiment of the present invention.

FIG. 3 is a flow chart illustrating a process for controlling battery discharging of the portable terminal according to an exemplary embodiment of the present invention.

Referring to FIGS. 1 and 3, the controller 140 boots the portable terminal when a power key of the key input unit 110 is input in step S210.

When the portable terminal is booted, the controller 140 determines if the external battery 173 has been connected with the portable terminal in step S220.

The controller 140 receives power from the embedded battery 171 and applies the power to the power supply unit 190 when the external battery 173 has not been connected with the portable terminal as a result of the determining in step S225.

Alternatively, if it is determined in step S220 that the external battery 173 is connected to the portable terminal, the controller 140 outputs a message which prompts a user to select the priority in discharging of the batteries in step S230. The message prompt may be output via the display unit 120 or the audio processing unit 150. According to an exemplary embodiment of the present invention, the message may include a message by which the user can select one of the embedded battery 171 and the external battery 173 by using a direction key, etc., and a text or voice containing the message is output.

The controller 140 determines if one of the embedded battery 171 and the external battery 173 is selected by the user who has confirmed the message in step S240.

When one of the embedded battery 171 and the external battery 173 is selected, the controller 140 causes the switch unit 180 to be controlled such that the selected battery and the power supply unit 190 are connected with each other. The controller 140 receives power from the selected battery and applies the power to the power supply unit 190 in step S250. Meanwhile, in a case that the selected battery is the external battery 173, the controller 140 can be supplied with power from the embedded battery 171 and apply the power to the power supply unit 190 when the external battery 173 is detached from the portable terminal during discharging.

In step S260, the controller 140 determines if a time interval (e.g. five seconds) passes when one of the embedded battery 171 and the external battery 173 is not selected in step S240. At this time, the time interval for selection of a battery by the user either may be predetermined or may be set by the user.

If no battery to be discharged is selected before the time interval passes, the controller 140 causes the switch unit 180 to be controlled such that the external battery 173 and the power supply unit 190 are connected to each other. The controller 140 receives power from the external battery 173 and applies the power to the power supply unit 190 in step S270.

The controller 140 determines if the external battery 173, which supplies power to the power supply unit 190, has been completely discharged in step S280. The controller 140 can periodically determine a voltage of a battery so as to identify if a corresponding battery is completely discharged.

The controller 140 connects the embedded battery 171 and the power supply unit 190 with each other through the switch unit 180 when the external battery 173 has been completely discharged. Therefore, the controller 140 can apply power from the embedded battery 171 to the power supply unit 190 in step S290.

Figure 4:
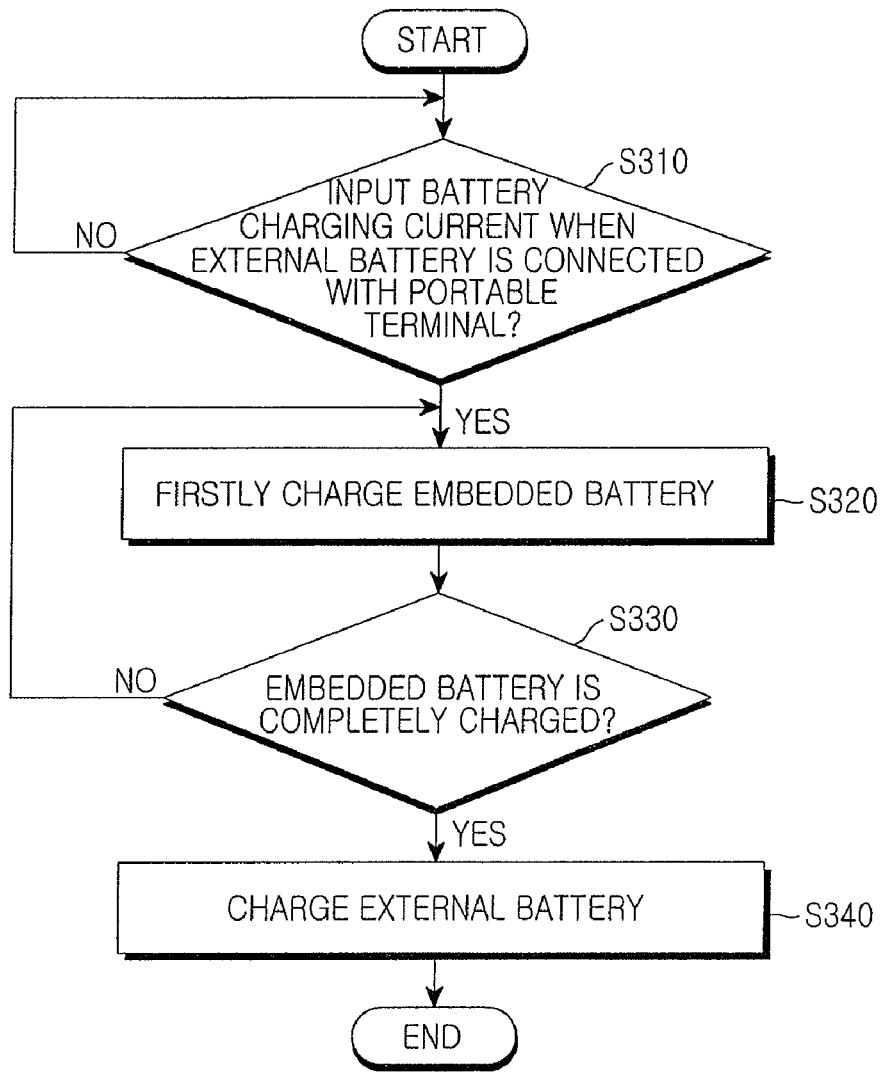
FIG. 4 is a flow chart illustrating a process for controlling battery charging of the portable terminal according to an exemplary embodiment of the present invention.

FIG. 4 is a flow chart illustrating a process for controlling battery charging of the portable terminal according to an exemplary embodiment of the present invention.

Referring to FIGS. 1 and 4, the controller 140 determines if battery charging current is input in a state that the external battery 173 is connected with the portable terminal in step S310.

In step S320, the controller 140 first charges the embedded battery 171 of the portable terminal through the charging unit 160 when battery charging current is input in a state that the external battery 173 is connected with the portable terminal. Although it is described in an exemplary embodiment of the present invention that the controller determines if battery charging current is input in a state that the external battery 173 has been connected with the portable terminal, the controller also can determine if the external battery 173 has been connected with the portable terminal when the battery charging current is input.

The controller 140 determines if the embedded battery 171 is completely charged in step S330. The controller 140 can periodically determine a voltage of the embedded battery 171 during charging so as to identify if the embedded battery 171 is completely charged.

The controller 140 charges the external battery 173 through the charging unit 160 when the embedded battery 171 is completely charged in step S340.

Meanwhile, the controller 140 may output a message for notifying that a corresponding battery is being charged in charging the embedded battery 171 or the external battery 173.

In an exemplary embodiment, the exemplary method illustrated in FIG. 4 may be performed following the method illustrated in FIG. 2. That is, following the receiving of power from an embedded battery 171, the battery charging method illustrated in FIG. 4 may be employed.

Figure 5:
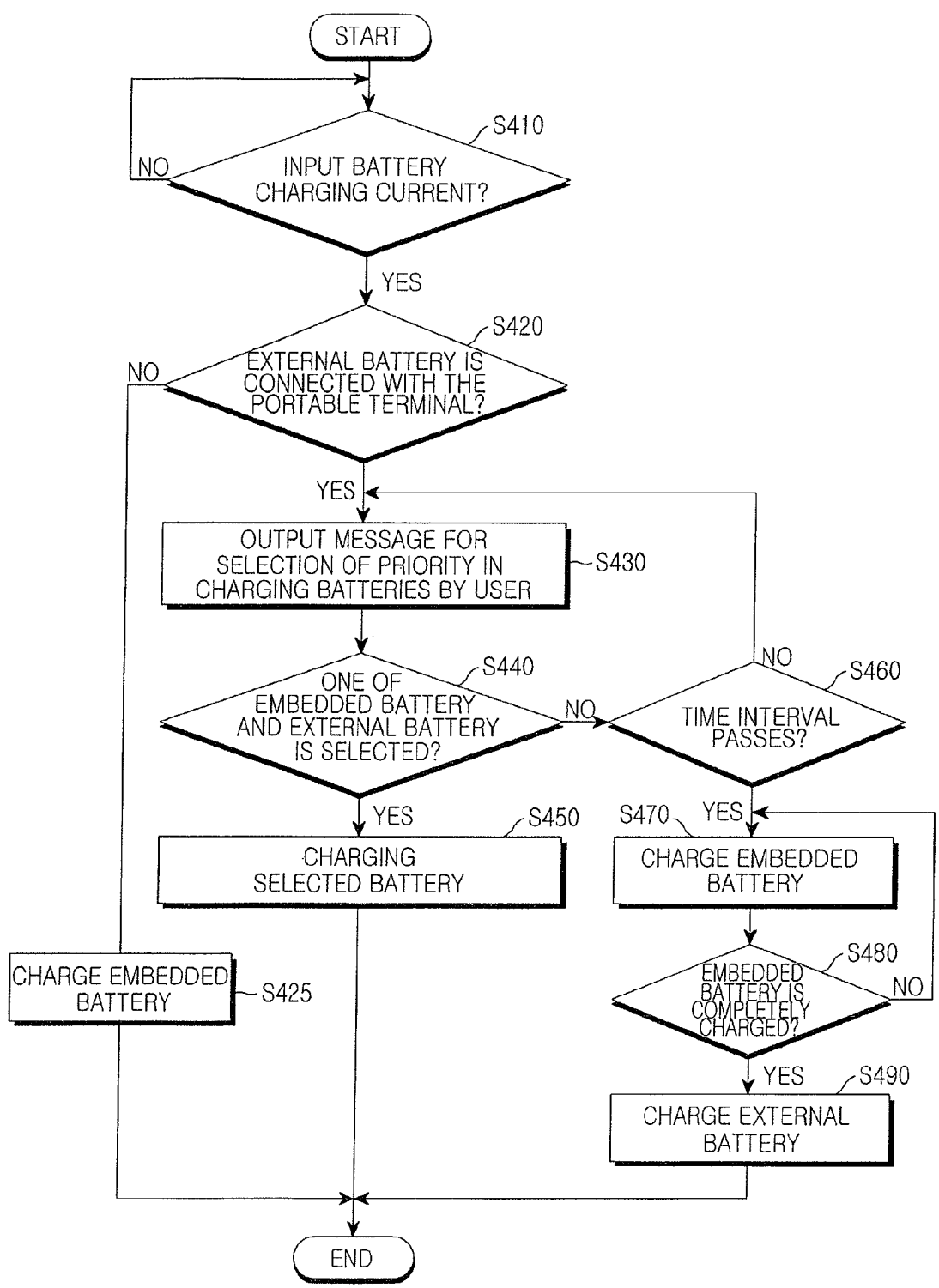
FIG. 5 is a flow chart illustrating a process for controlling battery charging of the portable terminal according to an exemplary embodiment of the present invention.

FIG. 5 is a flow chart illustrating a process for controlling battery charging of the portable terminal according to an exemplary embodiment of the present invention.

Referring to FIGS. 1 and 5, the controller 140 determines if battery charging current is input from a charger (not shown) assembled with the portable terminal in step S410.

The controller 140 determines if the external battery 173 has been connected with the portable terminal when the battery charging current is input in step S420.

The controller 140 charges the embedded battery 173 through the charging unit 160 and finishes the charging when the external battery 173 has not been connected with the portable terminal as a result of the determining in step S425.

Meanwhile, the controller 140 outputs a message prompt to the user for selecting the priority in charging the batteries when the external battery 173 has been connected with the portable terminal as a result of the determining in step S430. At this time, the controller 140 can output a text containing the message via the display unit 120 or a voice containing the message via the audio processing unit 150.

The controller 140 determines if one of the embedded battery 171 and the external battery 173 is selected by the user who has responded to the message in step S440.

When one of the embedded battery 171 and the external battery 173 has been selected, the controller 140 charges the selected battery through the charging unit 160 in step S450.

The portable terminal according to an exemplary embodiment of the present invention may include a separate switch for connecting the charging unit 160 with the embedded battery 171 or the external battery 173.

Meanwhile, in a case that the selected battery is the external battery 173, the controller 140 charges the embedded battery 171 if the external battery 173 is separated from the portable terminal during charging.

In step S460, the controller 140 determines if a time interval (e.g. five seconds) passes before one of the embedded battery 171 and the external battery 173 is selected as a result of the determining in step S440. At this time, the time interval for selection of a battery by the user either may be predetermined or may be set by the user.

The controller 140 first charges the embedded battery 171 through the charging unit 160 if no battery to be charged is selected before the time interval passes in step S470.

The controller 140 determines if the embedded battery 171 is completely charged in step S480. The controller 140 can periodically determine a voltage of the embedded battery 171 during charging so as to identify if the embedded battery 171 is completely charged.

The controller 140 charges the external battery 173 through the charging unit 160 when the embedded battery 171 is completely charged in step S490.

In exemplary embodiments of the present invention as described above, power from an external battery is first used when a portable terminal assembled with the external battery is used, and an embedded battery is first charged when charging the batteries. Therefore, the embedded battery capacity of the portable terminal can maintained as much as possible.

Furthermore, although the external battery is separated from the portable terminal during battery charging/discharging, the embedded battery capacity can be maintained as much as possible. As a result, even if only the embedded battery is used, a using time of the embedded battery can be increased. Therefore, it is possible to improve the user's convenience.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling battery discharging and recharging in a portable terminal, the method comprising:
   determining if a detachable external battery has been connected with the portable terminal;
   receiving power from the detachable external battery if the detachable external battery is connected with the portable terminal;
   receiving power from an embedded battery of the portable terminal if the detachable external battery has been completely discharged; and
   receiving power from the embedded battery if the detachable external battery is separated from the portable terminal during discharging of the detachable external battery.

2. The method as claimed in claim 1, wherein the determining is performed when the portable terminal is booted.

3. The method as claimed in claim 1, further comprising:
   charging the embedded battery of the portable terminal when battery charging current is input in a state that the detachable external battery has been connected with the portable terminal; and charging the detachable external battery when the embedded battery is completely charged.

4. The method as claimed in claim 3, further comprising outputting a message for notifying that a corresponding battery is being charged during the charging of at least one of the embedded battery and the external battery.

5. A method for controlling battery discharging in a portable terminal having a detachable external battery, the method comprising:
   determining if the detachable external battery has been connected with the portable terminal;
   outputting a message prompting a user to select a priority in discharging the batteries if the detachable external battery is connected with the portable terminal; and
   if one of the detachable external battery and an embedded battery of the portable terminal is selected by the user in response to the message, receiving power from the selected battery.

6. The method as claimed in claim 5, wherein the determining is performed when the portable terminal is booted.

7. The method as claimed in claim 5, further comprising receiving power from the embedded battery if the external battery is separated from the portable terminal during discharging in a case that the selected battery is the external battery.

8. The method as claimed in claim 5, wherein the receiving of power comprises:
   receiving power from the external battery if one of the embedded battery and the external battery is not selected during a time interval after the message is output; and
   receiving power from the embedded battery if the external battery has been completely discharged.

9. An apparatus for controlling battery discharging in a portable terminal having a detachable external battery, the apparatus comprising:
   a power supply unit for applying power supplied from at least one of the detachable external battery and an embedded battery of the portable terminal to the portable terminal;
   a switching unit for switching power of the embedded battery or the detachable external battery so as to transfer the switched power to the power supply unit; and
   a controller for determining if the detachable external battery has been connected with the portable terminal, for applying power of the detachable external battery to the power supply unit through the switching unit if the detachable external battery has been connected with the portable terminal, for applying power of the embedded battery to the power supply unit if the detachable external battery is completely discharged, and for applying power of the embedded battery to the power supply unit if the external battery is separated from the portable terminal while power of the external battery is applied to the power supply unit.

10. The apparatus as claimed in claim 9, wherein the controller determines if the detachable external battery has been connected when portable terminal is booted.

11. The apparatus as claimed in claim 9, wherein the controller outputs a message prompting a user to select a priority in discharging the batteries when the external battery is connected with the portable terminal while the portable terminal is booted.

12. The apparatus as claimed in claim 11, wherein when one of the embedded battery and the external battery is selected by the user who has responded to the message, the controller applies power of the selected battery to the power supply unit.

13. The apparatus as claimed in claim 12, wherein if the selected battery is the external battery, the controller applies power of the embedded battery to the power supply unit if the external battery is separated from the portable terminal during discharging.

14. The apparatus as claimed in claim 11, wherein when one of the embedded battery and the external battery is not selected during a time interval after the message is output, the controller first applies power from the external battery to the power supply unit.

15. A method for controlling battery recharging in a portable terminal having a detachable external battery, the method comprising:
   determining if the detachable external battery has been connected with the portable terminal when battery charging current is input;
   outputting a message prompting a user to select a priority in charging the batteries when the detachable external battery has been connected with the portable terminal; and
   if one of the detachable external battery and an embedded battery of the portable terminal is selected by a user in response to the message, charging the selected battery.

16. The method as clamed in claim 15, wherein the charging of the selected battery comprises charging the embedded battery if the external battery is separated from the portable terminal during charging if the selected battery is the external battery.

17. The method as claimed in claim 15, wherein the charging of the selected battery comprises charging the embedded battery if one of the embedded battery and the external battery is not selected during a time interval after the message is output, and charging the external battery when the embedded battery is completely charged.

18. An apparatus for controlling battery recharging in a portable terminal having a detachable external battery, the apparatus comprising:
   a charging unit for charging at least one of an embedded battery and the detachable external battery with current input from an external charger;
   a controller for charging the embedded battery when battery charging current is input from the charger in a state that the detachable external battery has been connected with the portable terminal, for charging the detachable external battery when the embedded battery is completely charged, and for outputting a message notifying that at least one of the embedded battery and the detachable external battery is being charged.

19. The apparatus as claimed in claim 18, wherein the controller outputs a message prompting a user to select a priority in charging the batteries when the battery charging current is input in a state that the external battery has been connected with the portable terminal.

20. The apparatus as claimed in claim 19, wherein when one of the external battery and the embedded battery is selected by the user in response to the message, the controller first charges the selected battery.

21. The apparatus as claimed in claim 20, wherein the controller charges the embedded battery when the external battery is separated from the portable terminal during charging in a case that the selected battery is the external battery.

22. The apparatus as claimed in claim 18, wherein when one of the embedded battery and the external battery is not selected during a time interval after a message is output, the controller first charges the embedded battery and then charges the external battery when the embedded battery is completely charged.

* * * * *